United States Patent [19]
Shaw et al.

[11] Patent Number: 5,337,777
[45] Date of Patent: Aug. 16, 1994

[54] AUTOMATIC SPRINKLER CONTROL OVERRIDE APPARATUS

[76] Inventors: David C. H. Shaw; Judy Z. Z. Shaw, both of 3312 E. Mandeville Pl., Orange, Calif. 92667

[21] Appl. No.: 55,993

[22] Filed: May 3, 1993

Related U.S. Application Data

[63] Continuation-in-part of Ser. No. 958,199.

[51] Int. Cl.⁵ .............................................. F16K 17/36
[52] U.S. Cl. ................... 137/78.2; 137/392; 137/545; 239/65
[58] Field of Search ............ 137/78.2, 392, 544, 137/545; 239/65; 200/84

[56] References Cited

U.S. PATENT DOCUMENTS

| | | | |
|---|---|---|---|
| 2,517,195 | 8/1950 | Gaspar | 137/544 |
| 2,785,007 | 3/1957 | Jensen | 299/25 |
| 3,118,606 | 1/1964 | Rotunda | 137/78.2 |
| 3,127,108 | 3/1964 | Harris | 239/65 |
| 3,212,714 | 10/1965 | Davis et al. | 137/78.2 |
| 3,407,608 | 10/1968 | Whitehead | 61/13 |
| 3,422,833 | 1/1969 | Kitrilakis | 137/78.2 |
| 3,500,844 | 3/1970 | Sanner | 137/78.2 |
| 3,750,950 | 8/1973 | Whitener | 239/63 |
| 4,541,446 | 9/1985 | Hogan | 137/78.2 |
| 4,919,165 | 4/1990 | Lloyd | 137/78.2 |

Primary Examiner—A. Michael Chambers
Attorney, Agent, or Firm—Henderson & Sturm

[57] ABSTRACT

An apparatus (10) for controlling an automatic timer regulated sprinkler system; wherein, the apparatus (10) comprises a float member (60) disposed within a multi-stage screen member (30) secured within a receptacle member (20); and, wherein, the float member is operatively associated with a switch member (50) for controlling the flow of electrical current to the sprinkler system in response to the level of collected water within the receptacle member. Another apparatus (200) for controlling an automatic timer regulated sprinkler system; wherein, the apparatus (200) comprises a water-amount-responsive means (204) containing water absorbing material; and, wherein, the water-amount-responsive means is operatively associated with a switch means (203) for controlling the flow of electrical current to the automatic sprinkler system in response to the change in gravitational force or expansile force produced by water on the water-amount-responsive means. Each apparatus (10, 200) can override the timer's regulation of the automatic sprinkler system. Alternatively, each apparatus (10, 200) can substitute the timer and control the automatic sprinkler system through a feedback control mechanism.

27 Claims, 8 Drawing Sheets

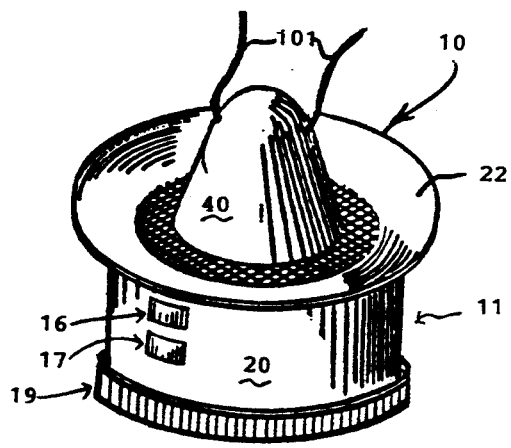
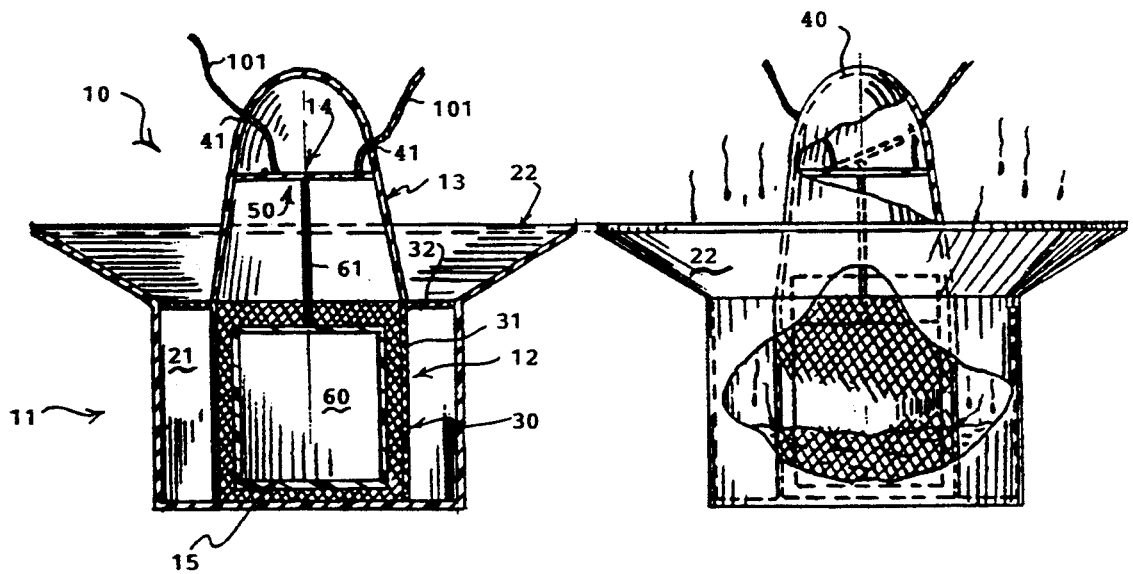
FIG 1
FIG 2
FIG 3

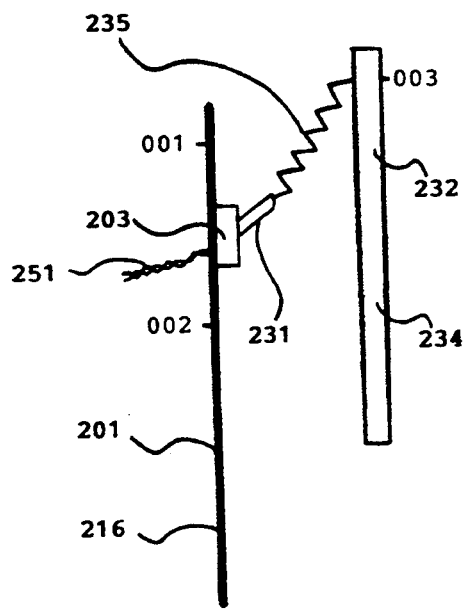
Fig. 17A
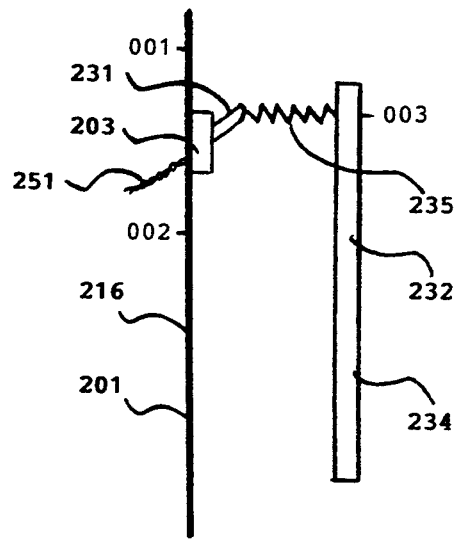
Fig. 17B
FIG 17
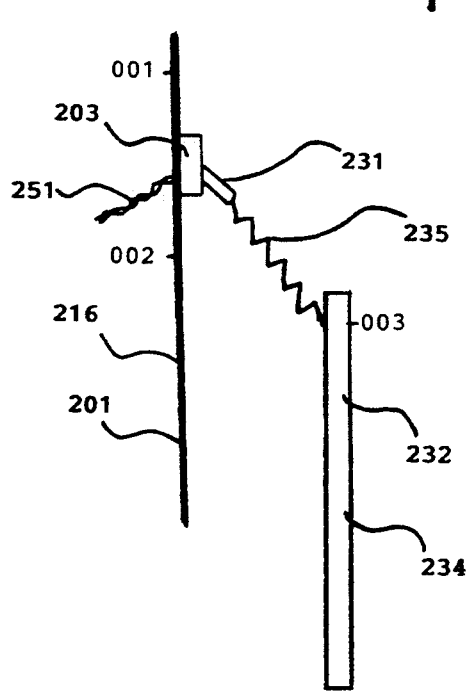
Fig. 17C
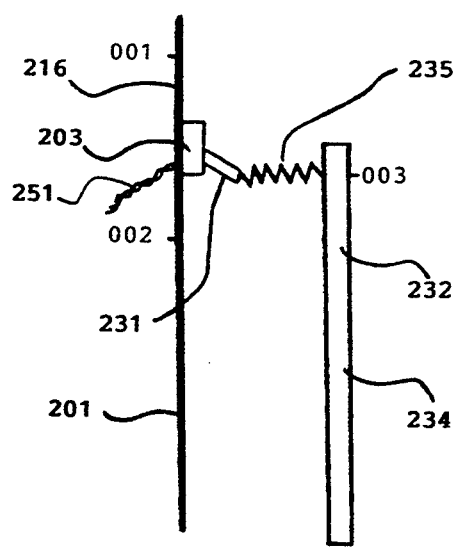
Fig. 17D

AUTOMATIC SPRINKLER CONTROL OVERRIDE APPARATUS

This application is a continuation-in-part of our previous application, Ser. No. 07/958,199, filed on Oct. 8, 1992; now U.S. Pat. No. 5,241,978 issued Sep. 7, 1993, and this invention was the subject matter of Document Disclosure Program Registration No. 303,838 which was filed in the United States Patent and Trademark Office on Mar. 16, 1992.

TECHNICAL FIELD

The present invention relates to the field of automatic sprinkler control systems in general, and in particular to a condition responsive override system that will disable the automatic sprinkler control system during periods of heavy rain or the like.

BACKGROUND ART

This application is a continuation-in-part of our previous application, Ser. No. 07/958,199, filed on Oct. 8, 1992; now U.S. Pat. No. 5,241,978 issued Sep. 7, 1993, and this invention was the subject matter of Document Disclosure Program Registration No. 303,838 which was filed in the United States Patent and Trademark Office on Mar. 16, 1992.

As can be seen by reference to the following U.S. Pat. Nos. 3,750,950; 3,407,608; 2,785,007; and 3,127,108; the prior art is replete with myriad and diverse automatic condition responsive sprinkler control arrangements.

While all of the aforementioned prior art constructions are more than adequate for the basic purpose and function for which they have been specifically designed, these patented arrangements normally incorporate a condition responsive mechanism into the automatic control system per se; and they do not address the problem faced by existing timer regulated automatic sprinklers that are not equipped with a condition responsive override switch that will temporarily disable the timer mechanism from activating the sprinkler system during periods of ample rainfall.

As a consequence of the foregoing situation, there has existed a longstanding need among owners of timer actuated automatic sprinkler systems for a condition responsive override system that can be incorporated into their existing systems to insure that the sprinkler system is disabled during periods of either ample or excessive rainfall; and, the provision of such a construction is a stated objective of the present invention.

Another objective of the present invention is to have an automatic sprinkler control apparatus which can regulate an automatic sprinkler through a feedback mechanism. The feedback control can either substitute or supplement the timer control.

BRIEF DISCLOSURE OF THE INVENTION

The present invention includes two preferred embodiments. The first preferred embodiment is an automatic sprinkler control apparatus which comprises in general: a housing unit; screen units; a cover unit; a switch unit; one or a plurality of window units; a bottom cap unit; and, a float unit.

The housing unit comprises in general a receptacle member defining a reservoir for rain water or water sprinkled from a sprinkler system; wherein the receptacle member is further provided with a funnel shaped lip element that will assist in the collection of water.

The screen units comprise multi-stage screen members that will limit the amount of debris that can accumulate both generally within the interior of the receptacle member, and specifically with regard to the central portion of the receptacle member.

In addition, the screen members form a support surface for the cover unit; wherein the switch unit is operatively deployed within the cover unit and connected by electrical wires to the control circuitry of a conventional timer actuated sprinkler system; and, the float unit is disposed within the receptacle member and operatively connected on one end to the switch unit to interrupt the flow of current through the automatic sprinkler system when a certain amount of water accumulates within the receptacle member.

One or a plurality of window units are disposed on the side walls of the receptacle member; wherein opening or closing of a specific window unit provides adjustment of the maximum amount of water allowed to accumulate in the reservoir after an excessive rainfall, and consequently provides adjustment of the period of time during which the sprinkler system is disabled after excessive rainfall.

The bottom cap unit is disposed at the bottom of the receptacle member; wherein opening of said bottom cap promotes ease for maintenance to clean up any dirt or debris accumulated within the interior of the receptacle member; and opening of said bottom cap further allows the owner of this apparatus to temporarily disable this apparatus for whatever reason.

As will be explained in greater detail further on in the specification, the float unit is protected by at least two stages of screeing; and it is very important to the operating characteristics of this first embodiment that debris be prevented from accumulating beneath the float unit; so as to preclude the inadvertant tripping of the switch unit during dry periods, due to the presence of debris beneath the float unit.

The second preferred embodiment is another automatic sprinkler control apparatus which comprises in general: a receptacle unit; a water-amount-responsive unit; a switch unit; and, screen units.

In the second embodiment, the receptacle unit comprises in general a receptacle member to house the water-amount-responsive unit and the switch unit. The functions of the switch unit and the screen units are similar to those in the first preferred embodiment.

The water-amount-responsive unit includes a material or mixture of materials which can absorb water. After absorption of water the weight of the material or materials will increase; and the weight increase is associated with increase in gravitational force. The change in gravitational force is then utilized to turn on or turn off the switch unit. The switch unit is operatively connected by electrical wires to the control circuitry of a conventional timer actuated sprinkler system.

In a modified aspect of the second embodiment, the water-amount-responsive unit includes a material or mixture of materials which expand with water and shrink with dryness. The expansion force or shrinking force are utilized to turn on or turn off a switch unit, similar to the teachings of the foregoing embodiments.

BRIEF DESCRIPTION OF THE DRAWINGS

These and other attributes of the invention will become more clear upon a thorough study of the following description of the preferred embodiments for carrying out the invention, particularly when reviewed in conjunction with the drawings, wherein:

FIG. 1 is an isolated perspective view of a first sprinkler control apparatus that forms the basis of the first preferred embodiment of the present invention;

FIG. 2 is a cross-sectional view of the first sprinkler control apparatus during dry conditions;

FIG. 3 is a partial cross-sectional view of the first sprinkler control apparatus during wet conditions;

FIG. 17 is a vertical sectional plan view of a switch unit and a lever element to show the relationship between a switch actuation bar and a switch spring element in the second preferred embodiment;

FIG. 17A illustrates that when the lever element is above a first predetermined level which is designated by a numeral (001), the switch unit is turned on;

FIG. 17B illustrates that the switch stays on when the lever element is between the first predetermined level and a second predetermined level; wherein the second predetermined level is designated by a numeral (002);

FIG. 17C illustrates that when the lever element is below the second predetermined level, the switch is turned off;

FIG. 17D illustrates that the switch stays off when the lever element is between the first predetermined level and the second predetermined level; and, FIG. 18 is an exploded perspective view of the second sprinkler control apparatus in the second preferred embodiment.

PREFERRED EMBODIMENTS FOR THE INVENTION

This invention includes two preferred embodiments. In each embodiment, water-related natural force is utilized to turn on or turn off a switch which is operatively connected to a timer-regulated automatic sprinkler.

The first preferred embodiment is based on a principle that accumulated water can produce a floating force on a float unit. The floating force, magnitude dependent on the amount of water collected, can be utilized to operate a switch. Although the principle of floating force per se is not new, utilization of the floating force to operate a switch in the control mechanism of an automatic sprinkler system is a novel concept.

The second preferred embodiment is based on a principle that a material absorbing water will have weight increase and the weight increase is associated with increase in gravitational force. The said gravitational force can be utilized to operate a switch. A modified aspect of the second embodiment is based on another principle that a selected material can expand its size after absorption of water. Utilization of water-related gravitational force or expansile force to operate a switch in the control mechanism of an automatic sprinkler system is another novel concept of the present invention.

FIRST PREFERRED EMBODIMENT FOR THE INVENTION

Figure 11:
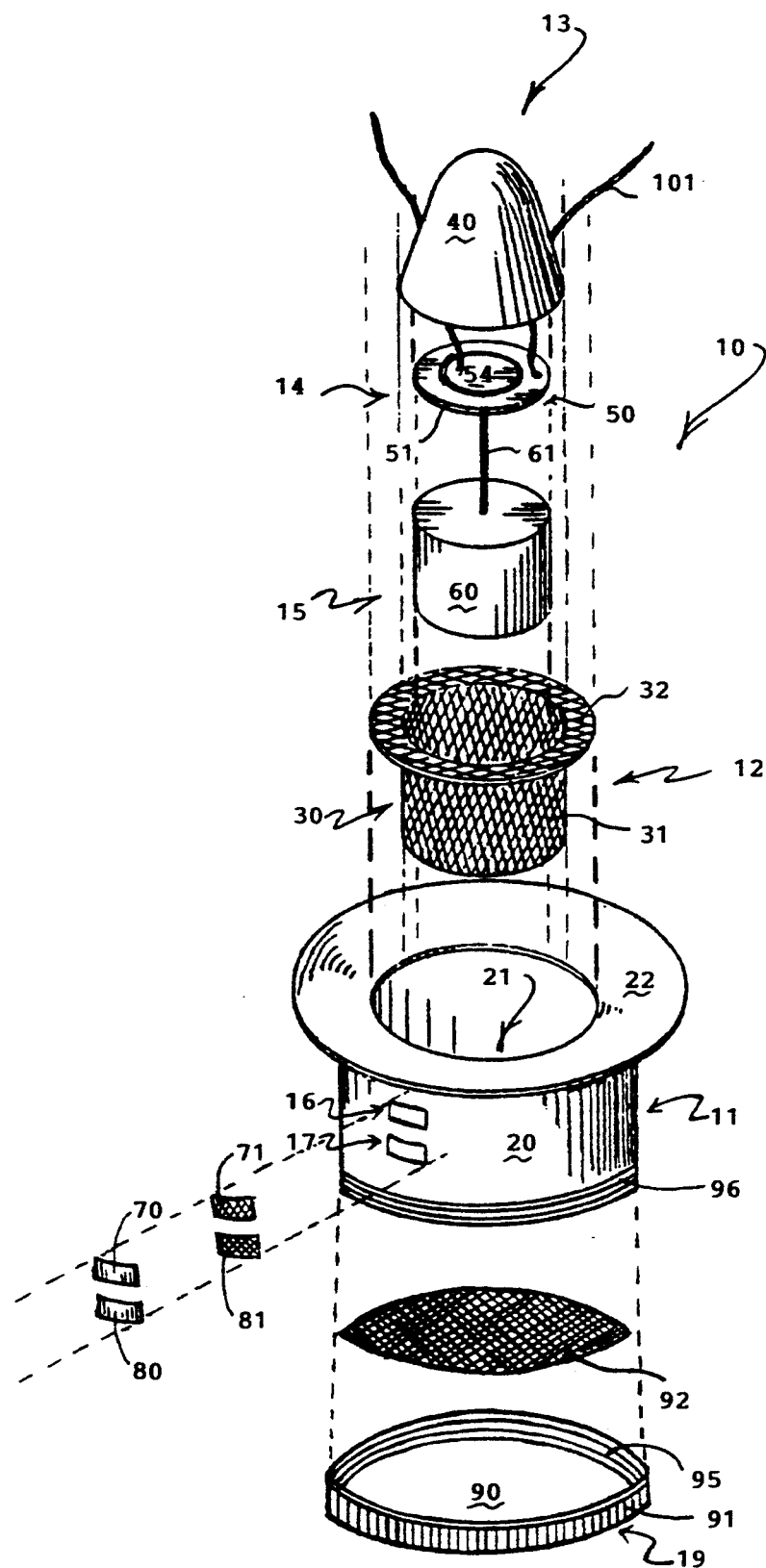
FIG. 11 is an exploded perspective view of the first sprinkler control apparatus.

As shown in FIGS. 1, 2 and 11, a first automatic sprinkler control override apparatus that forms the basis of the first preferred embodiment is designated generally by a reference numeral (10). The apparatus (10) comprises in general: a housing unit (11); one or a plurality of screen units (12); a cover unit (13); a switch unit (14); a float unit (15); optional one or a plurality of window units (16, 17); and an optional bottom cap unit (19).

The housing unit may have a generally cylindrical shape, a generally cubic shade, or other convenient shades. FIGS. 2 and 11 illustrate an example of a housing unit (11) which comprises a generally cylindrical shaped receptacle member (20) defining a fluid reservoir (21); wherein, the upper end of the receptacle member (20) is provided with an enlarged generally funnel shaped lip element (22) whose purpose is to collect and direct water into the interior of the fluid reservoir.

Still referring to FIGS. 2 and 11, it can be seen that the screen units (12) include a multiple stage screen member (30). The screen member (30) includes cylindrical screens arrayed in a generally vertically oriented central portion (31) and peripheral screens arrayed in a generally horizontally disposed peripheral lip portion (32); wherein the lip portion (32) is dimensioned to contact the upper end of the receptacle member (20) and the upper end of the central portion (31) of the screen member in abutting fashions. Other screen units for optional window openings and an optional bottom opening will be described hereinafter. Each of the aforementioned screen unit includes one or a plurality of layers of screens.

Figure 6:
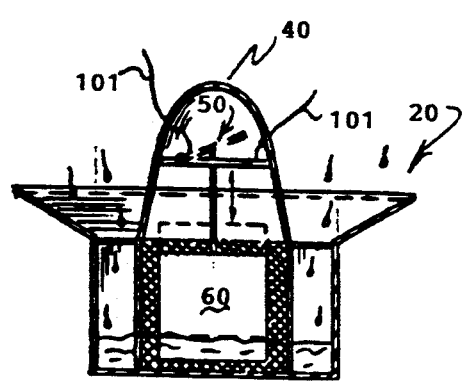
FIG. 6 is a cross-sectional view of the first sprinkler control apparatus during wet conditions.

Turning now to FIGS. 2, 3 and 6, it can be seen that the cover unit (13) comprises a generally elongated dome shaped cover member (40) which is supported by the screen member (30) and provided with a pair of discrete apertures (41) which are dimemsioned to receive electrical leads (101) from an automatic timer regulated sprinkler system (100).

Figure 4:
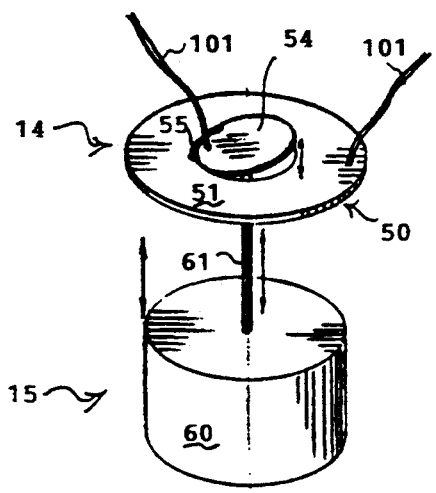
FIG. 4 is an isolated perspective view of the float unit and the switch unit.
Figure 5:
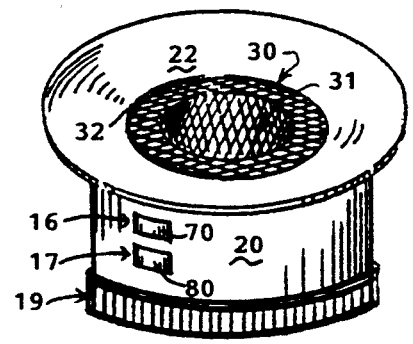
FIG. 5 is an isolated perspective view of the housing unit and screen unit.

The switch unit (14) shown in FIGS. 2, 4 and 11 is a simplified schematic drawing. The switch unit comprises a switch member (50) which includes: an annular conductive ring element (51) secured on its outer periphery to the interior of the cover member (40) at a point which is above the level of the lip element (22); and a disk shaped switch (54) which is pivotally secured as at (55) to one interior edge of the ring element (51).

Still referring to FIGS. 2, 4 and 11, it can be seen that the float unit (15) comprises a generally closed end hollow cylindrical float member (60) having a stem element (61) attached to and projecting upwardly from the top of the float member (60); wherein the stem element (61) is adapted to contact the bottom of the switch (54) to lift the switch out of electrical contact with the conductive ring element (51).

As can be seen particularly by reference to FIG. 4, one of the electrical leads (101) is attached to the conductive ring (51), and the other electrical lead (101) is affixed to the conductive disk shaped switch (54); wherein, the hinge (55) is fabricated from an electrically insulated material, such that when the switch is in the closed position depicted in solid lines in FIGS. 2 and 3, electrical current will flow between the electrical leads (101); and, when the switch (54) is in the open position as depicted in FIG. 4, electrical current will be interrupted.

Figure 7:
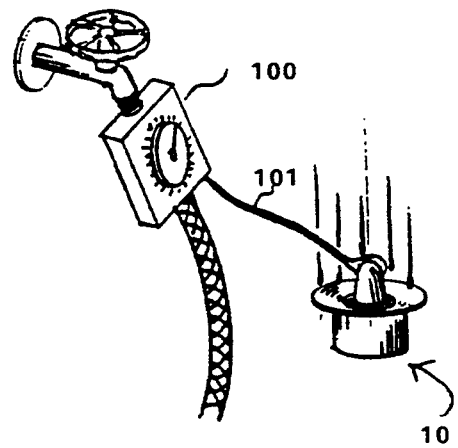
FIG. 7 is a simplified schematic diagram of the first sprinkler control apparatus operatively attached to a timer actuated automatic sprinkler system.

As can best be seen by reference to FIGS. 6 and 7, during dry periods the float member (60) will rest on the bottom of the receptacle member (20), with the switch member (54) being in the closed position as depicted in the solid lines of FIG. 6. During this time period electrical current will be flowing through the electrical leads (101) such that the timer controlled automatic sprinkler system (100) will function in its intended manner.

However, during rainy weather, the cover member (40) and the lip element (22) of the receptacle member (20) will funnel rainwater into the reservoir (21) of the receptacle member (20). Once the level of the accumulated rainwater reaches a predetermined height the float member (60) will rise within the reservoir (21) and the float member stem (61) will pivot the switch (54) into the open position thereby disabling the automatic sprinkler system (100)until the water level drops within the reservoir due to evaporation.

Figure 8:
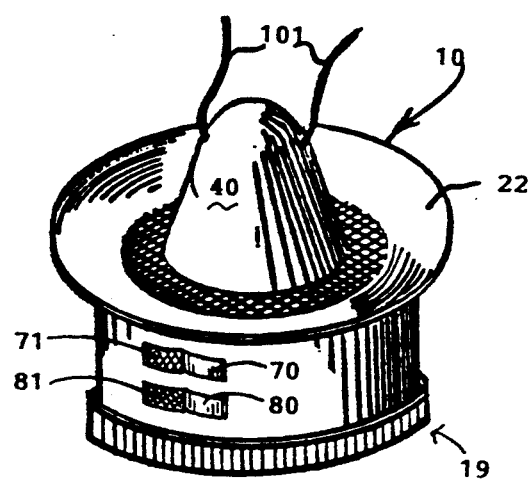
FIG. 8 is an isolated perspective view of the first sprinkler control apparatus with the window units open.

As shown in FIGS. 1, 8, and 11, the window units (16, 17) comprise a plurality of small window members (70, 80) on the cylindrical portion of the receptacle member (20). The windows (70, 80) are arrayed at different heights. By opening or closing a specific window, the owner of this override apparatus (10) can adjust the amount of rainwater which can accumulate in the reservoir (21) of the receptacle member (20). When a lower window (80) is open, the rainwater above this window level will overflow out of the reservoir (21) after an excessive rainfall. Thus only a relatively small amount of rainwater can accumulate in the reservoir (21). Consequently, it will take only a relatively short period of time for the rainwater to evaporate; and thus the sprinkler system (100) will be disabled for a relatively short period of time. When all windows are closed, relatively large amount of rainwater can accumulate in the reservoir (21) after an excessive rainfall. Consequently relatively long period of time will be needed for the water to evaporate; and, thus the sprinkler system (100) will be disabled for a relatively long period of time. Thus, the owner can adjust the desired period of time during which the automatic sprinkler (100) is disabled after excessive rainfall, in accordance with any special need of the garden or lawn and the weather condition.

As shown in FIG. 8, each window member (70, 80) can be opened by sliding it to one side along the window grooves or the like (of conventional structure, not shown). A window screen unit (71, 81) is disposed at each window opening to prevent the debris from entering the reservoir (21) when the window member is open.

Figure 9:
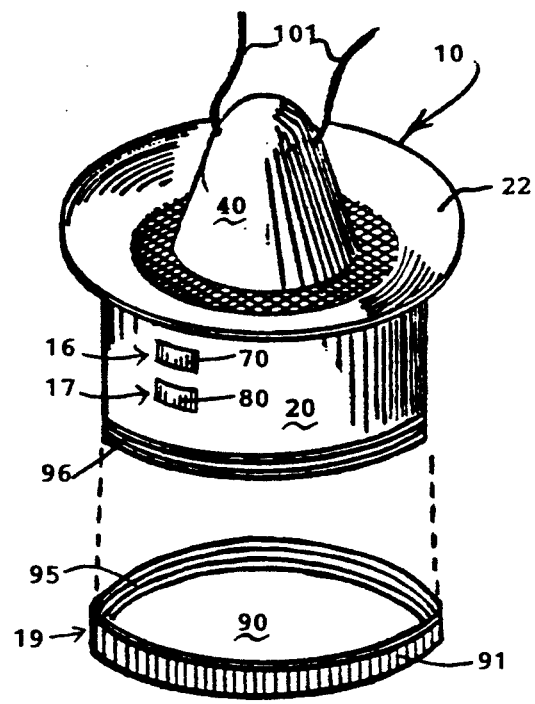
FIG. 9 is an isolated perspective view of the first sprinkler control apparatus with the bottom cap unit open.
Figure 10:
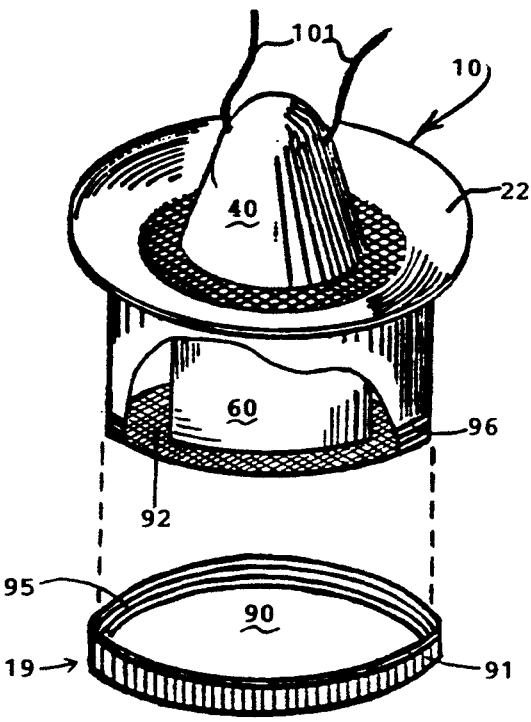
FIG. 10 is a partial cross-sectional view of the first sprinkler control apparatus with the bottom cap unit open.

Now turning to FIGS. 9 and 10, it can be seen that the bottom cap unit (19) comprises a disk-shaped cap (90) with lip portion (91). The interior of the lip portion (91) is provided with internal threading (95). The exterior of the lowest part of the receptacle member (20) is provided with external threading (96). Thus, the bottom cap unit (19) can be screwed into its position to closed the bottom opening of the receptacle member (20). As shown in FIG. 10, a bottom screen member (92) is disposed at the bottom opening to prevent the debris from entering the reservoir (21) when the bottom cap unit (19) is open; said bottom screen member (92) is removable and is dimensioned to contact the bottom interior part of the receptacle member (20) in an abutting fashion. The owner of this override apparatus (10) can open this bottom cap unit (19) and remove the bottom screen member (92) to clean up any dirt or debris accumulated in the reservoir (21) during annual maintenance. Another function of the bottom cap unit (19) is that the owner can leave the bottom cap open if occasionally the owner wants to temporarily disable this override apparatus for whatever reason.

As a modified aspect of this invention, the stem element (61) extending down from the switch unit (14) is threaded and contains an adjustable thumb screw such that contact by the float member (60) can be adjusted to activate the switch from various pre-set water levels.

It should be noted at this juncture that rainwater must pass through a plurality of stages of the multiple stage screen member (30), wherein, the horizontal lip portion (32) serves as the first stage screen which will prevent debris from entering into the reservoir (21) per se; while a plurality of layers of cylindrical screens in the vertically oriented central portion (31) of the screen member (30) surround the float member (60) and serve as additional stages of screening, which will prevent debris from accumulating beneath the float member (60) such that the switch (54) will be kept in the open position even during prolonged dry periods. The window screen members (71, 81) and the bottom screen member (92) also serve as the first stage screening to prevent debris from entering the reservoir (21) when the window units or the bottom cap unit are open. Each screen unit includes one or a plurality of layers of screens, and each layer of screen may be made of the same or different materials. Conventional metal screens, conventional plastic screens, fabric, porous metal plates, porous plastic plates and many other different materials are applicable for the screens in this invention.

This apparatus (10) further includes either a stake or a wall-mount structure (both of conventional designs, not shown in the drawings). A stake or other types of supporting structures can be fixedly attached to the apparatus such that the apparatus can stand in a lawn or a garden. Alternatively, a wall-mount structure can be fixedly attached to the apparatus such that the apparatus can be mounted on a fence or other structures in or surrounding a lawn or a garden.

As will be obvious to a person of ordinary skill in the art, this embodiment can be modified in many different ways. For example, either the switch unit (14) or the float unit (15) may be mounted on adjustable structures such that the switch unit or the float unit can be adjusted to different levels or different locations in order to activate the switch unit from different pre-selected water levels. As another modification, the stem element (61) may be substituted with a lever element which includes adjustable length, telescopic sections, joints with adjustable angles, or other adjustable parts. The lever is functionally connected to the float unit and is directly or indirectly connected with the switch unit such that adjustments may be made for the float unit to activate the switch unit from various pre-selected water levels. An example for an optional indirect connection between the lever element and the switch unit is through a spring, as further described in detail in the second preferred embodiment of this invention.

It should be further understood that the foregoing description of the switch unit (14) is a very primitive type of switch, merely for the purpose of easy schematic illustration in the drawings. Many different types of switches (of conventional structure, detail not described) may be applicable for this invention. Waterproof switches and switches which can be actuated and deactuated with very small forces will be suitable for this invention.

Besides the aforementioned override mechanism to control a timer regulated automatic sprinkler, the apparatus (10) in this embodiment may further control an automatic sprinkler through a feedback mechanism. The apparatus may be placed at a location where part of the water sprinkled from the sprinkler system can be caught by the apparatus. Alternatively, a small branch tube may connect the sprinkler system and the apparatus (10) such that a small amount of water flows to the reservoir (21) of the apparatus when the sprinkler system is sprinkling. Under the feedback control mechanism, when water collected in the reservoir is below a first predetermined level the switch unit (14) will be turned on to connect electric current to the sprinkler system to activate the sprinkling function. Whereas when water accumulated in the reservoir is above a second predetermined level, the switch unit will be turned off to deactivate the sprinkler system. To facilitate the function of the feedback control mechanism, the switch unit (14) should include a two-step switching mechanism with separated activation point and deactivation point. An example of this type of switch design is delineated in the second preferred embodiment, to be described hereinafter.

SECOND PREFERRED EMBODIMENT FOR THE INVENTION

In the first preferred embodiment of this invention, in spite of the presence of a plurality of screens, eventually small amount of dirt, debris or precipitates may accumulate in the fluid reservoir. Thus the first embodiment has a disadvantage that it requires very infrequent maintenance to clean out the accumulated dirt, debris or precipitates. The second preferred embodiment of this invention is designed to eliminate the foregoing disadvantage of the first embodiment.

Figure 12:
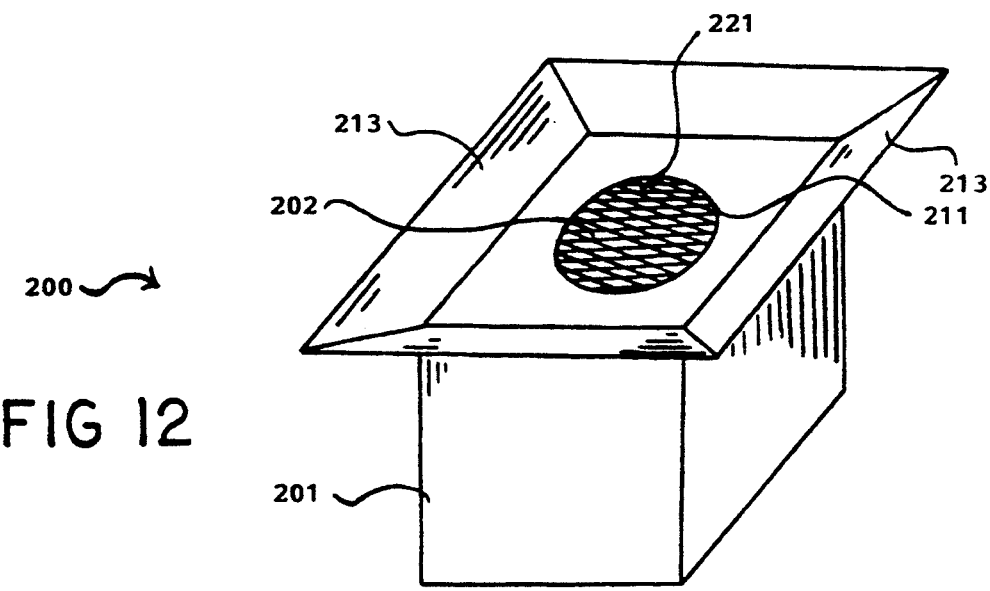
FIG. 12 is an isolated perspective view of a second sprinkler control apparatus that forms the basis of the second preferred embodiment of the present invention.
Figure 18:
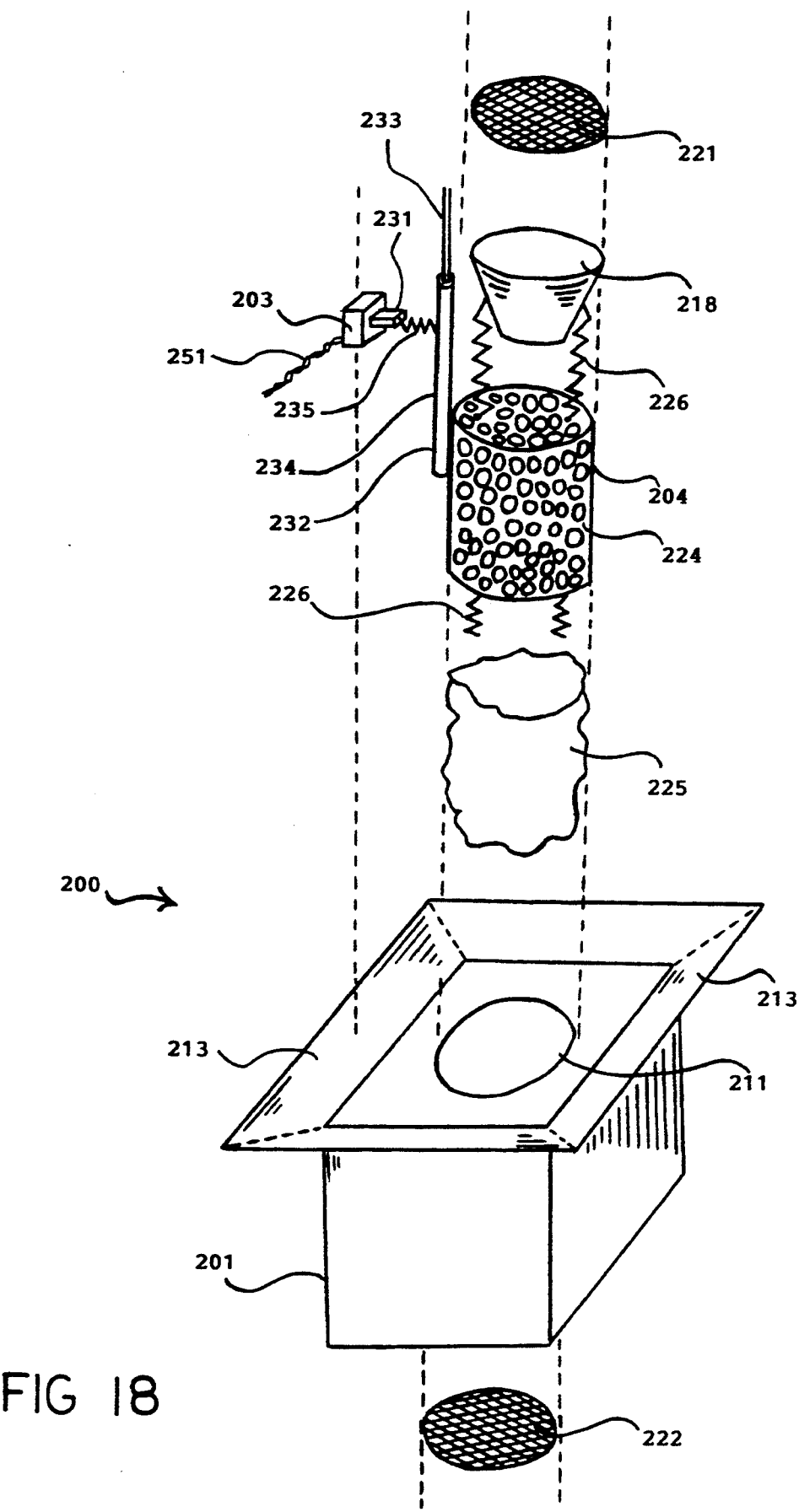

As shown in FIG. 12, an isolated perspective view, a second automatic sprinkler control override apparatus that forms the basis of the second preferred embodiment of the present invention is designated generally by a reference numeral (200). FIG. 18 is an exploded perspective view of the apparatus (200). As can be seen in FIGS. 12 and 18, the apparatus (200) comprises in general: a receptacle unit (201); screen units (202); a switch unit (203); and a water-amount-responsive unit (204).

The receptacle unit may have a generally cylindrical shape, or a generally cubic shape, or other convenient shapes. FIGS. 12 and 18 illustrate a receptacle unit (201) which has a generally cubic shape, with an upper opening (211) facing generally upward and a lower opening (212) facing generally downward. The upper opening is further illustrated in FIG. 13, a top plan view of the apparatus (200); while the lower opening is illustrated in FIG. 14, a bottom plan view of the apparatus.

Figure 13:
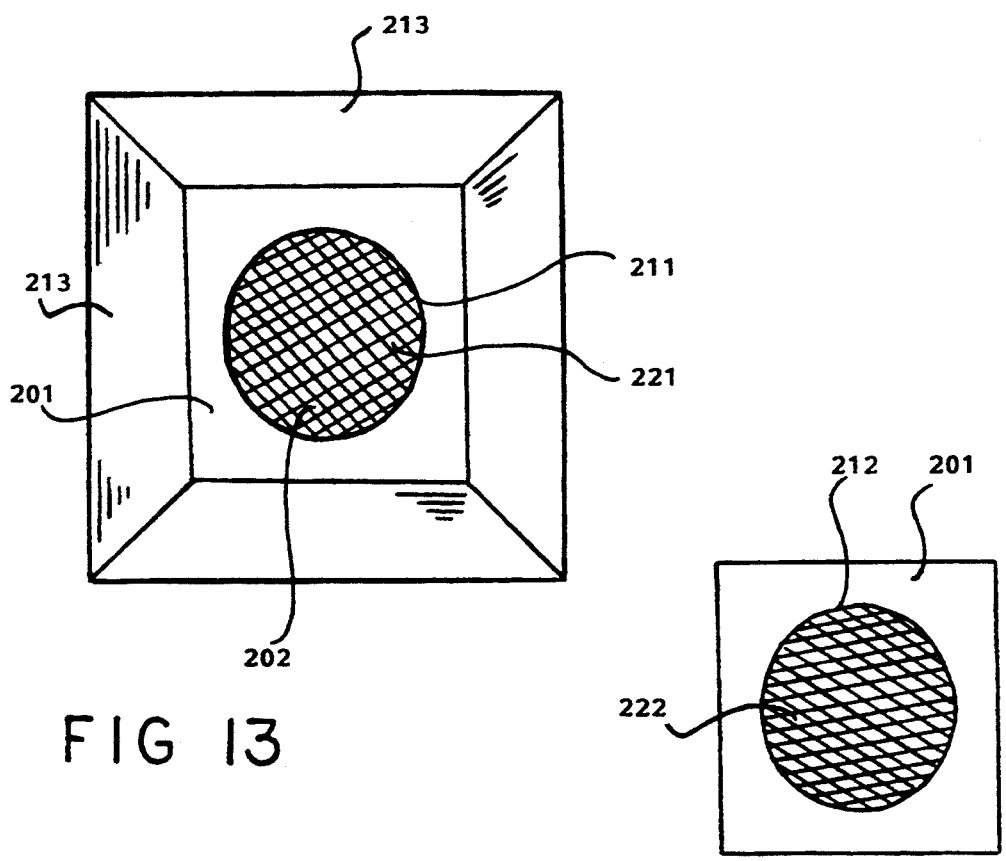
FIG. 13 is a top plan view of the second sprinkler control apparatus.
Figure 14:
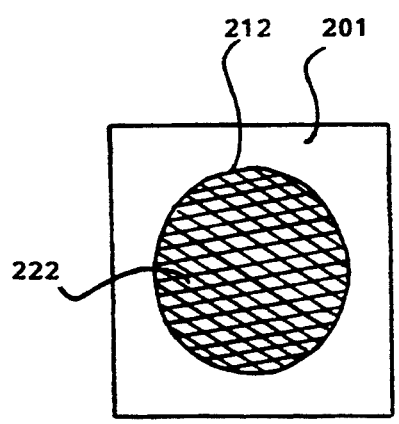
FIG. 14 is a bottom plan view of the second sprinkler control apparatus.

As an optional structure, and as illustrated in FIGS. 12 and 13, the upper end of the receptacle unit (201) is provided with an enlarged funnel element (213) extending from the upper side of the receptacle unit outward. The purpose of the funnel element (213) is to collect rain water or sprinkled water from a sprinkler system and direct the water into the interior of the receptacle unit (201).

The screen units (202) includes at least an upper screen member (221) and a lower screen member (222). Each screen member (221, 222) includes one or a plurality of layers of screens, made of plastic, fabric, metal or other suitable materials. The screen members will prevent dirt, debris or other objects from entering the interior of the receptacle unit (201). The screen members can allow water to flow in, flow out, or drip out of the receptacle unit. Furthermore, water vapor can pass readily through the screen members such that water inside the receptacle unit can also escape gradually through evaporation; and, excessive moisture or cold temperature in the outside air can deter the water evaporation process.

Figure 15:
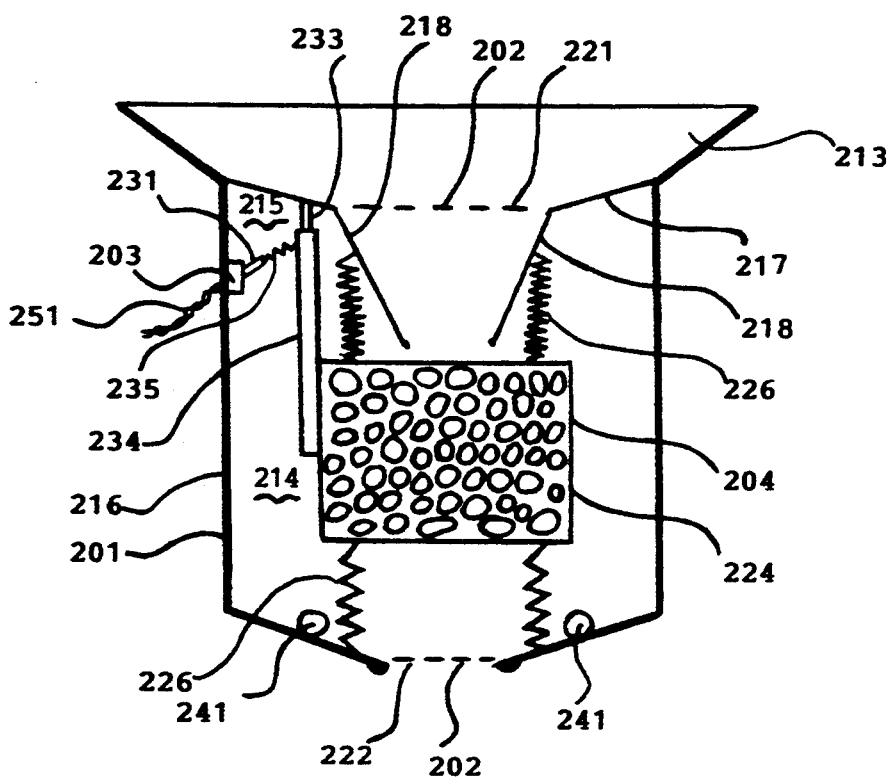
FIG. 15 is a vertical sectional plan view of the second sprinkler control apparatus during dry conditions.
Figure 16:
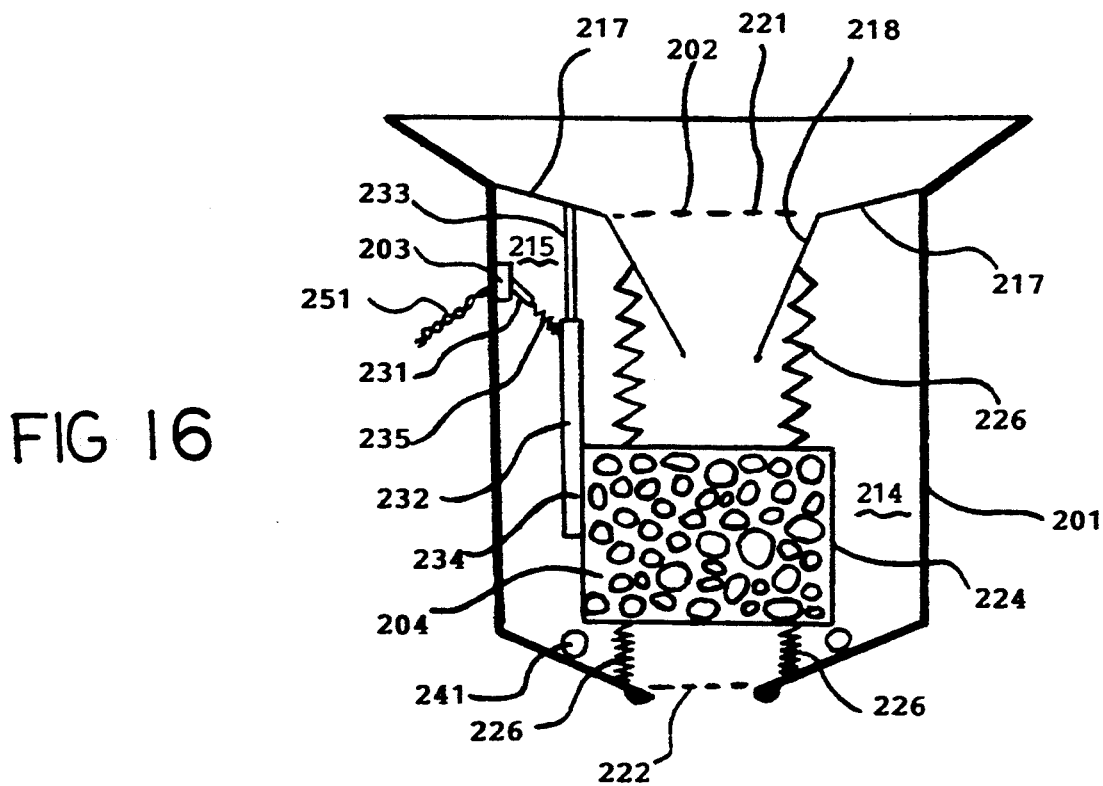
FIG. 16 is a vertical sectional plan view of the second sprinkler control apparatus during wet conditions.

FIG. 15 is a vertical sectional plan view of the apparatus (200) during dry conditions; whereas FIG. 16 is a vertical sectional plan view of the apparatus (200) during wet conditions. As illustrated in FIGS. 15 and 16, the interior of the receptacle unit (201) includes a housing compartment (214) for the water-amount-responsive unit (204) and a switch housing area (215) for the switch unit (203). The switch housing area (215) is generally located higher than the said housing compartment (214). The receptacle unit (201) further includes a guiding structure (218) which is a generally funnel-shaped structure extending from the upper opening (211) downward to the housing compartment (214). The purpose of the guiding structure (218) is to guide rain water or sprinkled water toward the water-amount-responsive unit (204) and to prevent water from entering the switch housing area (215).

The water-amount-responsive unit (204) includes a holder member (224) containing a material or mixture of materials capable of absorbing or retaining water and also capable of allowing water to gradually escape through dripping, flowing or evaporation. Many different materials are suitable for the water absorbing material (225) in this embodiment; examples including sponge, natural or synthetic fabrics, foam rubber, sand, brick, gravel and many other organic or inorganic materials. Materials which do not decay or disintegrate during long term exposure to water, sun, snow and other natural conditions are preferred. Materials which resemble soil in water absorption and retention are also preferred. The water absorbing material or materials (225) are contained within the said holder member (224).

The surface of the holder member (224) is either very porous or has plenty of openings to allow water to enter and to get out of the holder member very easily. The holder member is suspended by one or a plurality of spring elements (226) or other elastic elements. The spring elements (226) are fixedly attached to the receptacle unit (201). When the water absorbing material (225) becomes wet, its weight will increase and thus the associated gravitational force acting on the holder member (224) will increase. The increase in gravitational force will lengthen the spring elements (226) and consequently lower the elevation level of the holder member (224). Thus the elevation of the holder member and the magnitude of the gravitational force are dependent on the amount of water absorbed by the water absorbing material (225).

The switch unit (203) is disposed in the switch housing area (215) and is attached to a side wall (216) of the receptacle member. The switch unit includes a switch actuation bar (231). The switch unit can be turned on by pushing the switch actuation bar to an upper position as shown in FIGS. 15, 17A and 17B; and the switch unit can be turned off by pushing the switch actuation bar to a lower position as shown in FIGS. 16, 17C and 17D.

A lever element (232) is functionally connected with the water-amount-responsive unit (204). The lever element (232) is also functionally connected either directly or indirectly with the switch unit (203). The lever element is made of flexible or bendable material. The length of the lever element is changeable. An example is a lever element including a sliding joint such that the length of the lever element is readily changeable. As another example, and as illustrated in FIGS. 15 and 16, the lever element (232) includes at least two telescopic sections, an inner section (233) and an outer section (234), such that the length of the lever element can change readily, depending on the elevation of the water-amount-responsive unit (204). The inner section (233) of the lever element is attached to a roof (217) of the receptacle unit (201). The outer section (234) is attached to the holder member (224) of the water-amount-responsive unit (204).

Several different designs are applicable to functionally connect the lever element (232) to the switch actuation bar (231), including direct connection or indirect connection. As an example of indirect connection, and as depicted in FIGS. 15, 16, and 17, one or a plurality of switch spring elements (235) are functionally connected with the outer section (234) of the lever element and the switch actuation bar (231). Thus the water-amount-responsive unit (204) can control the switch unit (203) through the series of lever element (232), switch spring element (235) and switch actuation bar (231). The magnitude of the pulling force of the switch spring element upon the switch actuation bar is dependent on the elevation of the lever element which is related to the elevation of the holder member (224); while the elevation of the holder member is dependent on the magnitude of the gravitational force on the holder member; while the magnitude of the gravitational force on the holder member is dependent on the weight of the water absorbing material (225). Accordingly, the water-amount-responsive unit (204) can control the turning on or turning off of the switch unit (203) in response to the amount of water absorbed by the water absorbing material (225).

In FIGS. 15, 16, 17 and 18, electric wires (251) connects the switch unit to an automatic sprinkler system (not shown).

As illustrated in FIG. 17, one purpose of the switch spring element (235) is that turning on or turning off of the switch unit (203) are associated with two separated elevation levels of the lever element (232). When an attachment point (003) where the switch spring element (235) attaches to the lever element is above a first predetermined level (001), the switch actuation bar (231) will be pulled to the upper position to turn on the switch unit (203), as in FIGS. 15, and 17A. Whereas, when the attachment point (003) is below a second predetermined level (002), the switch actuation bar will be pulled to the lower position to turn off the switch unit (203), as shown in FIGS. 16 and 17C. The first predetermined level (001) is higher than the second predetermined level (002).

The second purpose of the indirect connection through the switch spring element (235) is to create a no change zone for the switch when the lever element's (232) elevation is between the first (001) and the second (002) predetermined levels, as in FIGS. 17B and 17D. Within the no change zone, the switch spring element (235) is barely stretched, and thus there is little pulling on the switch actuation bar (231). Accordingly, when the lever element's (232) elevation is either above the first predetermined level or stays within the no change zone, a turned-on switch will remain on. The switch will be turned off only when the lever element moves below the second predetermined level. Likewise, when the lever element is either below the second predetermined level or stays within the no change zone, a turned-off switch will remain off. The switch will be turned on again only when the lever element moves above the first predetermined level. The presence of the foregoing no change zone and the two separated turning-on and turning-off levels will facilitate a feedback control mechanism of this apparatus (200) upon an automatic sprinkler system.

The third purpose of the switch spring element (235) is to allow extra room for the lever element (232) to either move above the first predetermined level or move below the second predetermined level. As an optional design, one or a plurality of stops (241) may be arrayed on the interior of the receptacle unit (201) to prevent the holder member (224) from moving outside of the desirable ranges.

Similar to the first embodiment, the apparatus (200) in the second embodiment further includes either a stake or a wall-mount structure (both of conventional structures, not shown in the drawings). A stake or other types of supporting structures can be fixedly attached to the apparatus (200) such that the apparatus can stand in a lawn or a garden. Alternatively, a wall-mount structure can be fixedly attached to the apparatus (200) such that it can be mounted on a fence or the like in a lawn or garden.

As a modified aspect of the second embodiment, the water-amount-responsive unit includes a holder member holding or containing a material or mixture of materials which can change in size according to the amount of water absorbed. Examples of such materials include human hair, animal tissues, sponge, wood and many others. Materials used in mechanical hygrometer are also applicable. Thus the amount of water absorbed is related to the magnitude of expansile force or shrinking force and these forces can change the position of the holder member. The expansile force or shrinking force can be utilized to turn on or turn off a switch, said switch being functionally connected with an automatic sprinkler system to control the sprinkling function, in accordance with the foregoing teachings of this invention.

Similar to the first preferred embodiment, the second preferred embodiment may be modified in many other ways. For example, either the switch unit (203) or the spring element (226) may be mounted on adjustable structures such that the owner of this apparatus (200) may make adjustments for the lever element (232) to actuate the switch unit from various pre-selected elevations. As other optional modifications, the length of the outer section (234) of the lever element may be adjustable; or the inclination of the lever element may be adjustable; or the length of the switch spring element (235) may be adjustable; or the attachment point (003) where the switch spring element attaches to the lever element may be adjustable. Any of these modifications can provide options of adjustment such that the holder member (224) can actuate the switch unit (203) from various adjustable pre-selected elevations, corresponding to different amount of water contained by the water-amount-responsive unit (204).

This apparatus (200) may control a timer-regulated automatic sprinkler as an override apparatus to override the regulation by the timer. This apparatus (200) may further control the automatic sprinkler system through a feedback control mechanism, similar to the teachings in the first preferred embodiment. This apparatus (200) may either substitute or supplement the timer to regulate the automatic sprinkler. An automatic sprinkler controlled by the said feedback control mechanism of this invention does have distinct advantages over traditional timer regulated automatic sprinkler. The advantages include saving of water in rainy days, accurate amount and accurate timing of watering, and elimination of the trouble of re-programming of the timer in dry seasons versus wet seasons.

The feedback control mechanism of this apparatus (200) may be utilized to supplement a timer in a way that both the apparatus (200) and the timer control the sprinkling function of an automatic sprinkler in coordinated controls. As an example of coordinated controls, the timer may determine when to initiate and when to stop the sprinkling function; while the apparatus (200) may prematurely terminate the sprinkling function when the soil is wet enough. Thus water sprinkling will be aborted in rainy days. The duration of each sprinkling will be determined by the apparatus according to weather conditions. Thus in cold or humid seasons, the duration of each sprinkling will be automatically shortened. Accordingly, re-programming of the timer in summer versus winter or in wet versus dry seasons is unnecessary. As another example of coordinated controls, the apparatus (200) may determine which day water sprinkling is needed; while the timer may delay or modify the sprinkling until a convenient time of that day, preferably in the night time.

The apparatus (200) in the second preferred embodiment is practically maintenance-free. Any dirt or debris entering the receptacle unit (201) through the upper opening (211) and the upper screen member (221) can spontaneously come out through the lower opening (212). Precipitates formed inside the receptacle unit (201) can also be washed out spontaneously. Furthermore, a heavy rain will help to flush out any residual dirt, debris and precipitates. The maintenance-free feature will be particularly important when this apparatus (200) is used to substitute a timer.

The apparatus (200) with feedback control mechanism may be combined with a microcomputer to control the sprinkling function of an automatic sprinkler system. The magnitudes of the force produced by the water-amount-responsive unit are converted into digital data by an electronic digital means. These data represent the amount of water contained by the water-amount-responsive unit and also reflect the wetness or dryness conditions of the soil. The microcomputer is functionally connected with the said digital means and the automatic sprinkler system. The microcomputer can process the said soil condition data to determine when to initiate sprinkling function and when to stop sprinkling function.

Having thereby described the subject matter of the present invention, it should be apparent that many other substitutions, modifications and variations of the invention are possible in light of the above teachings. It is therefore to be understood that the proper scope of the present invention should be determined by the broadest interpretation of the appended claims so as to encompass all such modifications and equivalents.

We claim:

1. An automatic sprinkler control apparatus for controlling the flow of electric current to a timer regulated automatic sprinkler system; wherein, the apparatus comprises:

a receptacle member defining a fluid reservoir; wherein, the receptacle member includes at least an opening facing generally upward to collect rain water or water sprinkled from the said sprinkler system;

float means disposed within a float housing portion of the said fluid reservoir; wherein, the float means can be floated to different levels with associated different magnitudes of floating force in response to the level of collected water within the fluid reservoir;

screen means to prevent dirt, debris or other objects from entering the fluid reservoir; wherein, the screen means can allow water to flow into or overflow out of the reservoir; and, the screen means can further allow water vapor to readily pass through the screen means such that water collected in the reservoir can escape gradually through evaporation; wherein, the screen means include a plurality of screens in a multi-stage screening arrangement, each stage of screening including at least one screen; wherein, the multi-stage screening includes at least a first stage screening to prevent dirt, debris or other objects from entering the float housing portion of the reservoir, said second stage screening encircling the float means to define the said float housing portion of the reservoir; and switch means operatively connected to the said sprinkler system; wherein, the switch means is functionally operated by the float means in a way such that the switch means can be turned on or turned off by the float means in response to the floated levels or the magnitudes of the floating force of the float means, said floated levels and magnitudes of the floating force being dependent on the levels of collected water within the reservoir.

2. The apparatus as in claim 1; wherein the timer regulated automatic sprinkler system includes an electric wire functionally connecting the timer and the sprinkler system to regulate the sprinkling function; and, the said electric wire is functionally connected with and controlled by the switch means; wherein, the switch means can be turned off by the float means to interrupt the electric connection between the timer and the sprinkler system when water collected in the reservoir exceeds a pre-selected level, thus temporarily overriding the regulation of the sprinkler system by the timer; and, the switch means can be turned on to restore the electric connection between the timer and the sprinkler system to restore the timer's regulation when water collected in the reservoir is below the pre-selected level or below another pre-selected level.

3. The apparatus as in claim 1; wherein, the switch means includes a spring or other elastic element in the operation process of the switch means such that turning on and turning off of the switch means are associated with two separated levels of water collected in the reservoir; wherein, the switch means will be turned on when the water collected in the reservoir is below a first predetermined level; and, the switch will be turned off when the water collected in the reservoir is above a second predetermined level; and, a turned-on switch will remain on when the water collected in the reservoir is between the first and the second predetermined levels; and, a turned-off switch will remain off when the water collected in the reservoir is between the first and the second predetermined levels.

4. The apparatus as in claim 3; wherein, part of the water coming out of the sprinkler system can enter the reservoir such that the apparatus can control the sprinkler system through a feedback mechanism; wherein, the feedback control mechanism includes the switch means being turned on to initiate the sprinkling function when water collected in the reservoir is below the said first predetermined level; and, the feedback control mechanism further includes the switch means being turned off to terminate the sprinkling function when water collected in the reservoir is above the said second predetermined level; wherein, the apparatus with the feedback control mechanism can be utilized to substitute the timer to regulate the automatic sprinkler system.

5. The apparatus as in claim 1; wherein, the said receptacle member is further provided with an outwardly projecting funnel element which will funnel rain water or water sprinkled from the sprinkler system into the said fluid reservoir.

6. The apparatus as in claim 1; further comprising a cover member dimensioned to overlie the float housing portion of the reservoir; wherein, the cover member forms a housing for the switch means, said switch means housing being disposed a substantial distance above the receptacle member and the funnel element.

7. The apparatus as in claim 1; further comprising a lever element functionally connecting the float means and the switch means; wherein, the lever element includes adjustable thumb screws, adjustable joints, adjustable length or other adjustable parts such that the float means can actuate the switch means in response to adjustable pre-selected water levels of the water accumulated in the reservoir.

8. The apparatus as in claim 1; further comprising one or a plurality of adjustable attachment structures; wherein, either the switch means or the float means or both are attached to the apparatus through the said adjustable attachment structures with the elevations, angles or locations of the switch means or the float means being adjustable such that the float means can actuate the switch means in response to adjustable preset water levels of the water accumulated in the reservoir.

9. The apparatus as in claim 1; further comprising either a stake means or a mounting means; wherein, the stake means is fixedly attached to the receptacle member or other parts of the apparatus such that the apparatus can stand in a lawn, a garden or the like; wherein, the mounting means is fixedly attached to the receptacle member or other parts of the apparatus such that the apparatus can be mounted on a fence or other structures in or near a lawn or a garden.

10. The apparatus as in claim 4; wherein, the apparatus with the feedback control mechanism is functionally associated with a timer such that both the apparatus and the timer can control the sprinkling function of the automatic sprinkler system in a coordinated way or various coordinated ways.

11. The apparatus as in claim 1; further comprising a microcomputer and an electronic digital means; said digital means being functionally connected with the float means to convert the magnitude of the floating force into digital data; said microcomputer being functionally connected with the automatic sprinkler system and the said digital means; wherein, the microcomputer can process the digital data of the floating force and send signals to the automatic sprinkler system either to initiate sprinkling function or to terminate sprinkling function or to regulate the automatic sprinkler system in other ways.

12. An automatic sprinkler control apparatus for controlling the flow of electric current to a timer regulated automatic sprinkler system; wherein, the apparatus comprises:

water-amount-responsive means, including a porous water permeable holder member containing a material or mixture of materials capable of absorbing or retaining water and also capable of allowing water to gradually escape through dripping or evaporation; wherein, the material or mixture of materials can produce a water-amount-responsive force, the magnitude of the said force being dependent on the amount of water contained by the said material or materials;

switch means operatively connected to the said sprinkler system; wherein, the switch means is functionally operated by the water-amount-responsive means in a way such that the switch means can be turned on or turned off in response to the magnitude of the said water-amount-responsive force;

a receptacle member defining a housing compartment to house the water-amount-responsive means and a housing area to house the switch means; wherein, the receptacle member includes at least an opening facing generally upward to allow rain water or water sprinkled from the said sprinkler system to enter the housing compartment and to enter the water-amount-responsive means; and, the receptacle member further includes at least an opening for water to drip out, flow out or evaporate out of the housing compartment and out of the water-amount-responsive means; and screen means to prevent dirt, debris or the like from entering the housing compartment or the housing area; wherein, the screen means can allow water to flow into or drip into the housing compartment and into the water-amount-responsive means; and, the screen means can further allow water to flow out, drip out or evaporate out of the water-amount-responsive means and out of the housing compartment.

13. The apparatus as in claim 12; wherein, the timer regulated automatic sprinkler system includes an electric wire functionally connecting the timer and the sprinkler system to regulate the sprinkling function; and, the said electric wire is functionally connected with and controlled by the switch means; wherein, the switch means can be turned off by the water-amount-responsive means to interrupt the electric connection between the timer and the sprinkler system when the magnitude of the said force exceeds a pre-selected amount, thus temporarily overriding the regulation of the sprinkler system by the timer; and, the switch means can be turned on to restore the electric connection between the timer and the sprinkler system to restore the timer's regulation when the magnitude of the said force is below the said pre-selected amount or below another pre-selected amount.

14. The apparatus as in claim 12; wherein, the switch means includes a spring or other elastic element in the operation process of the switch means such that turning on and turning off of the switch means are associated with two separated magnitudes of the water-amount-responsive force; wherein, the switch means will be turned on when the magnitude of the water-amount-responsive force is below a first pre-determined amount; and, the switch means will be turned off when the magnitude of the said force is above a second pre-determined amount; and, a turned-on switch will remain on when the magnitude of the said force is between the first and the second pre-determined amounts; and, a turned-off switch will remain off when the said force is between the first and the second pre-determined amounts.

15. The apparatus as in claim 14; wherein, part of the water coming out of the sprinkler system can enter the water-amount-responsive means such that the apparatus can control the sprinkler system through a feedback mechanism; wherein, the feedback control mechanism includes the switch means being turned on to initiate the sprinkling function when the magnitude of the water-amount-responsive force is below the said first pre-determined amount; and, the feedback control mechanism further includes the switch means being turned off to terminate the sprinkling function when the magnitude of the water-amount-responsive force is above the said second pre-determined amount; wherein, the apparatus with the feedback control mechanism can be utilized to substitute the timer to regulate the automatic sprinkler system.

16. The apparatus as in claim 15,; wherein, the apparatus with the feedback control mechanism is functionally associated with a timer such that both the apparatus and the timer can control the sprinkling function of the automatic sprinkler system in a coordinated way or various coordinated ways.

17. The apparatus as in claim 12; wherein, the water-amount-responsive force is gravitational force; and, the water-amount-responsive means contains a material or mixture of materials which will change in weight when absorbing water or retaining water and thus change in magnitude of gravitational force in response to the amount of water absorbed or retained; and, the holder member is movably suspended by one or a plurality of spring means or other similar elastic means, said spring means being attached to the receptacle member in a way such that the elevation of the holder member will vary according to the magnitude of the gravitational force; wherein, the switch means can be turned on or turned off in response to the elevation of the holder member or the magnitude of the gravitational force.

18. The apparatus as in claim 17; further comprising one or a plurality of adjustable features such that the water-amount-responsive means can actuate the switch means in response to adjustable pre-set amount of water contained by the water-amount-responsive means; wherein, the adjustable features include adjustable switch means, or adjustable water-amount-responsive means, or adjustable spring means or other adjustable parts of the apparatus.

19. The apparatus as in claim 12; wherein, the water-amount-responsive force is expansile-shrinking force; and, the water-amount-responsive means holds or contains a material or mixture of materials which will expand or shrink in size depending on the amount of water absorbed or contained and thus change in the magnitude of the expansile-shrinking force in response to the amount of water absorbed or contained; Wherein, the switch means can be turned on or turned off in response to the magnitude of the expansile-shrinking force.

20. The apparatus as in claim 12; further comprising one or a plurality of linkage means functionally connecting the switch means and the holder member of the water-amount-responsive means; wherein, the linkage means include adjustable length, or adjustable angles, or adjustable strength or other adjustable parts such that the water-amount-responsive means can actuate the switch means in response to adjustable pre-set amount of water contained by the water-amount-responsive means.

21. The apparatus as in claim 19; further comprising one or a plurality of adjustable features such that the water-amount-responsive means can actuate the switch means in response to adjustable pre-set amount of water contained by the water-amount-responsive means; wherein, the adjustable features include adjustable switch means, or adjustable water-amount-responsive means, or adjustable receptacle opening, or other adjustable parts of the apparatus.

22. The apparatus as in claim 12; wherein, the said receptacle member is further provided with an outwardly projecting funnel element which will funnel rain water or water sprinkled from the sprinkler system into the housing compartment; and, the receptacle member is further provided with a guiding structure to guide rain water or the sprinkled water toward the water-amount-responsive means, said guiding structure being able to prevent water from entering the switch means housing area.

23. The apparatus as in claim 12; wherein, the screen means include at least one or a plurality of layers of screens disposed at each opening of the receptacle member; and, the screen means are removable to promote ease in cleaning out any dirt, debris, precipitates or the like accumulated inside the receptacle member.

24. The apparatus as in claim 12; further comprising either a stake means or a mounting means; wherein, the stake means is fixedly attached to the receptacle member or other parts of the apparatus such that the apparatus can stand in a lawn, or a garden, or the like; wherein, the mounting means is fixedly attached to the receptacle member or other parts of the apparatus such that the apparatus can be mounted on a fence or other structures in or near a lawn or a garden.

25. The apparatus as in claim 12; further comprising a microcomputer and an electronic digital means; said digital means being functionally connected with the water-amount-responsive means to convert the magnitudes of the water-amount-responsive force into digital data; said microcomputer being functionally connected with the automatic sprinkler system and the said digital means; wherein, the microcomputer can process the digital data of water-amount-responsive force and send signals to the automatic sprinkler system either to initiate sprinkling function or to terminate sprinkling function or to regulate the automatic sprinkler system in other ways.

26. An automatic sprinkler control apparatus for controlling the flow of electric current to a timer regulated automatic sprinkler system; wherein, the apparatus comprises:

a receptacle member defining a fluid reservoir; wherein, the receptacle member includes at least an opening facing generally upward to collect rain water or water sprinkled from the said sprinkler system; and wherein, the receptacle member is further provided with one or a plurality of window elements, each window element being disposed at a pre-selected level on a side wall of the receptacle member, each window element being operable and closable such that the maximum amount of water allowed to accumulate in the reservoir can be adjusted; wherein, a window screen member is disposed adjoining each window element in a way such that the window screen member can prevent dirt, debris or other objects from entering the reservoir when the associated window element is open;

float means disposed within a float housing portion of the said fluid reservoir; wherein, the float means can be floated to different levels with associated different magnitudes of floating force in response to the level of collected water within the fluid reservoir;

screen means to prevent dirt, debris or other objects from entering the fluid reservoir; wherein, the screen means can allow water to flow into or overflow out of the reservoir; and, the screen means can further allow water vapor to readily pass through the screen means such that water collected in the reservoir can escape gradually through evaporation; and switch means operatively connected to the said sprinkler system; wherein, the switch means is functionally operated by the float means in a way such that the switch means can be turned on or turned off by the float means in response to the floated levels or the magnitudes of the floating force of the float means, said floated levels and magnitudes of the floating force being dependent on the levels of collected water within the reservoir.

27. An automatic sprinkler control apparatus for controlling the flow of electric current to a timer regulated automatic sprinkler system; wherein, the apparatus comprises:

a receptacle member defining a fluid reservoir; wherein, the receptacle member includes at least an opening facing generally upward to collect rain water or water sprinkled from the said sprinkler system;

float means disposed within a float housing portion of the said fluid reservoir; wherein, the float means can be floated to different levels with associated different magnitudes of floating force in response to the level of collected water within the fluid reservoir;

screen means to prevent dirt, debris or other objects from entering the fluid reservoir; wherein, the screen means can allow water to flow into or overflow out of the reservoir; and, the screen means can further allow water vapor to readily pass through the screen means such that water collected in the reservoir can escape gradually through evaporation;

switch means operatively connected to the said sprinkler system; wherein, the switch means is functionally operated by the float means in a way such that the switch means can be turned on or turned off by the float means in response to the floated levels or the magnitudes of the floating force of the float means, said floated levels and magnitudes of the floating force being dependent on the levels of collected water within the reservoir; and an operable and closable bottom element disposed at the bottom of the receptacle member; wherein, opening of the bottom element will make the receptacle member unable to collect water and thus allow temporary disabling of the said apparatus; and, opening of the bottom element will promote ease in cleaning out any dirt, debris or other objects accumulated in the reservoir; wherein, a bottom screen member is disposed adjoining the bottom element in a way such that the bottom screen member can prevent dirt, debris or other objects from entering the reservoir when the bottom element is open; and, the bottom screen member is removable to promote ease in cleaning out any dirt, debris or other objects accumulated in the reservoir.

* * * * *

UNITED STATES PATENT AND TRADEMARK OFFICE
CERTIFICATE OF CORRECTION

PATENT NO.  : 5,337,777
DATED       : August 16, 1994
INVENTOR(S) : David C. H. Shaw; Judy Z. Z. Shaw It is certified that error appears in the above-indentified patent and that said Letters Patent is hereby corrected as shown below:

Column 4, line 34, delete "shade" and substitute --shape--; Column 4, line 35, delete "shades" and substitute --shapes--.

Signed and Sealed this

Twenty-ninth Day of November, 1994

Attest:

BRUCE LEHMAN

*Attesting Officer*      *Commissioner of Patents and Trademarks*